June 23, 1970  K. BESOYAN  3,516,519
AUXILIARY BRAKE AND BRAKING SYSTEM
Original Filed Nov. 2, 1966  3 Sheets-Sheet 3
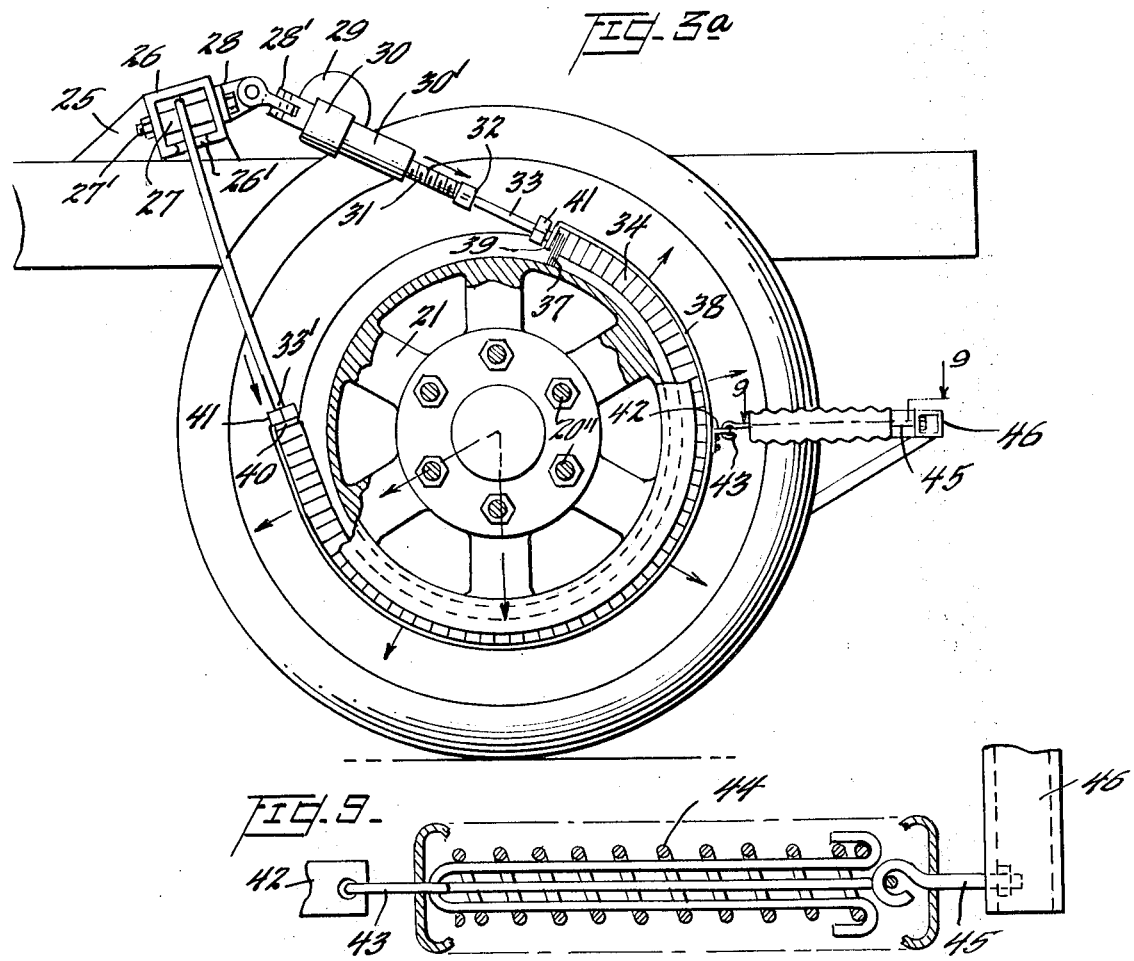
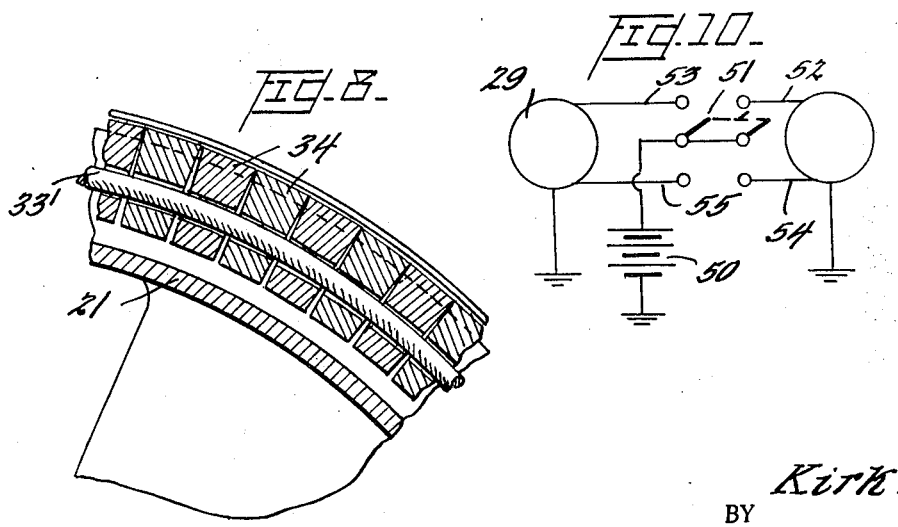
INVENTOR.
Kirk Besoyan,
BY
Watson, Cole, Grindle & Watson
ATTORNEYS United States Patent Office 3,516,519
Patented June 23, 1970

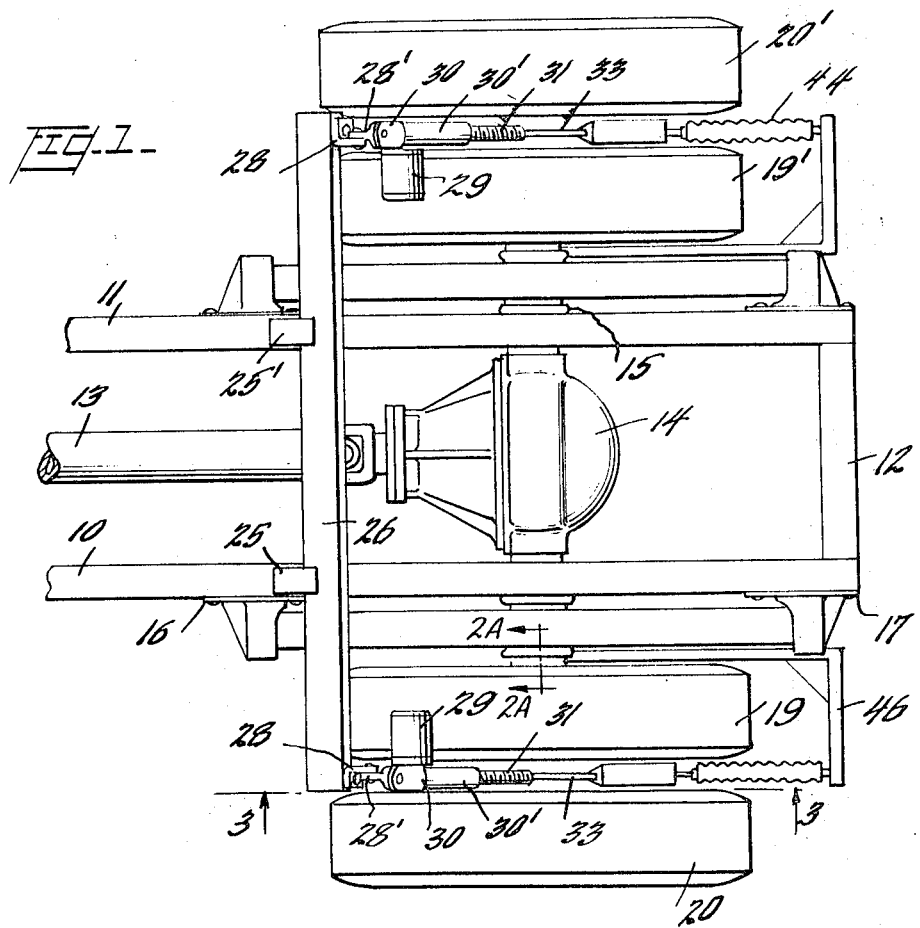
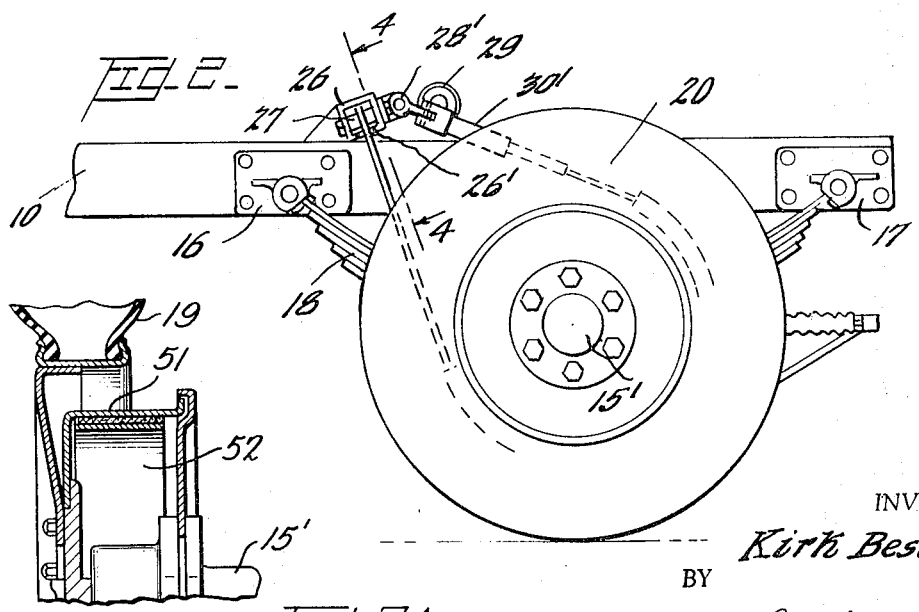

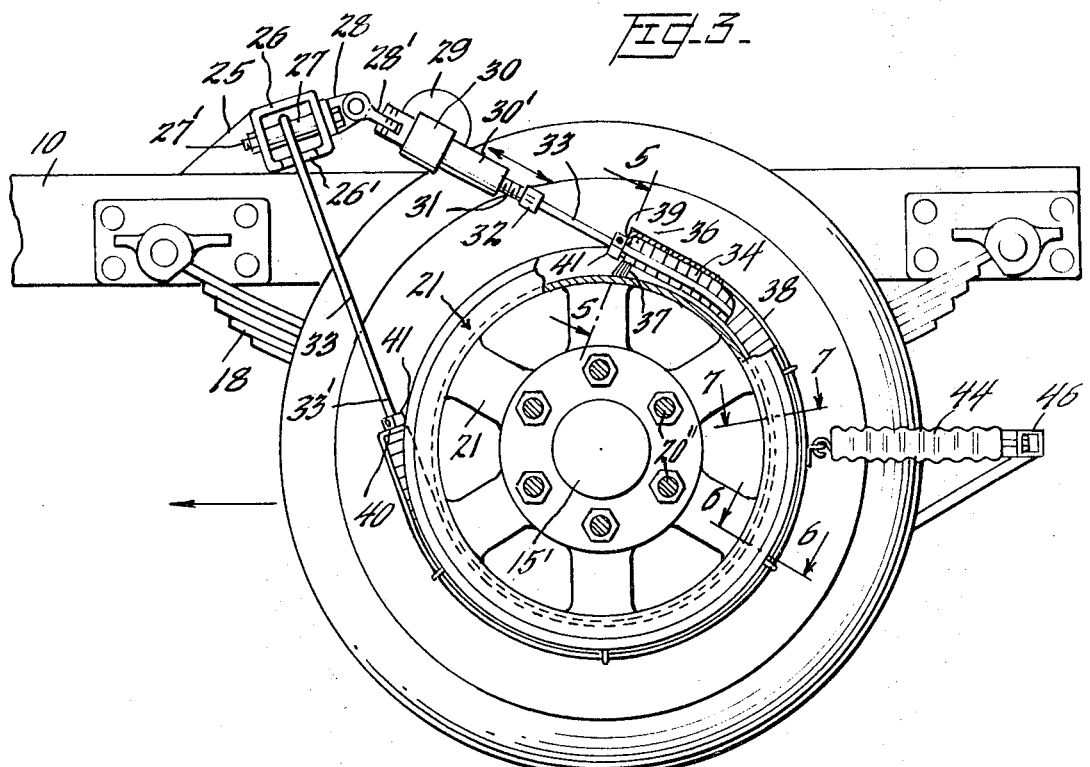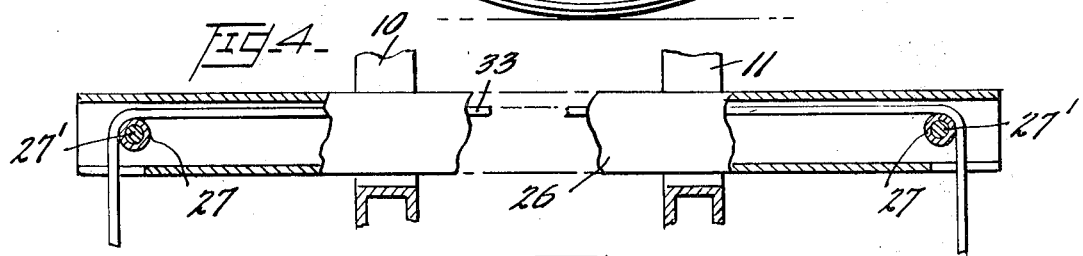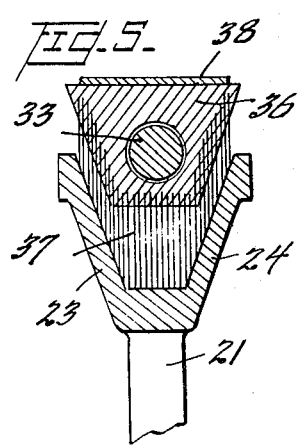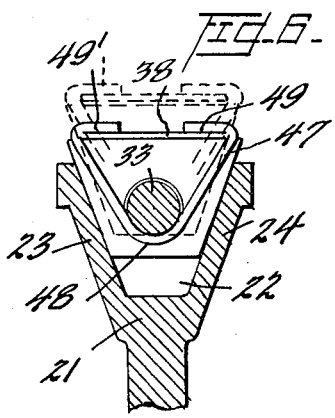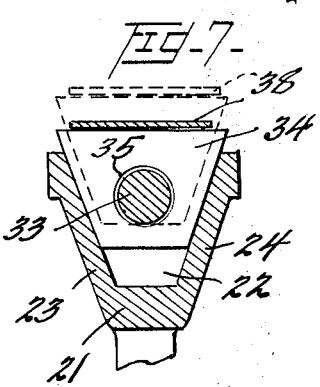

3,516,519
AUXILIARY BRAKE AND BRAKING SYSTEM
Kirk Besoyan, Gila Bend, Ariz., assignor to Auxiliary Brake Systems, Inc., Phoenix, Ariz., a corporation of Arizona
Continuation of application Ser. No. 591,513, Nov. 2, 1966. This application Feb. 19, 1969, Ser. No. 802,751
Int. Cl. F16d 49/02, 69/04
U.S. Cl. 188—77                                         13 Claims

ABSTRACT OF THE DISCLOSURE

A brake in which the brake shoes are carried by a flexible actuating cable extending about a V-shaped sheave which forms the brake drum of the wheel. An electric motor actuates the cable to apply the brake.

---

This application is a continuation of application Ser. No. 591,513, filed Nov. 2, 1966, now abandoned.

This invention relates to brakes and braking systems for trucks, truck tractors and other vehicles. More particularly, the invention pertains to brakes and brake mechanisms especially applicable to vehicles carrying or towing heavy loads, as auxiliary or emergency braking means in the event of failure of the standard or ordinary brakes or braking systems. As indicated the invention is applicable to various types of vehicles although it may have its most important application to those types generally employed by the trucking industry.

The principal object of the invention is to provide a brake or brake mechanism and system entirely independent of the usual or ordniary brakes of the vehicle and readily applicable to trucks, truck tractors, truck trailers and other vehicles as auxiliary and independent braking equipment whether applied as original equipment or added to the vehicle after its construction. It is also contemplated that the brake and system of this invention may be applied and used as a parking brake and/or, if desired, as the sole braking means of a vehicle rather than as an auxiliary or emergency braking means.

Another important object is to provide a simple and inexpensive brake and braking system that may be readily and inexpensively applied to vehicles and, also, readily and inexpensively removed and replaced whenever necessary. In this connection it may be noted that the invention is of such nature and construction in part that it is ideally adapted to vehicles having dual or multiple wheels at the opposite ends of an axle.

A further object is to provide a brake and braking system in which the braking elements or brake shoes may be carried by a flexible cable or the like extending about a sheave (preferably having a V-shaped groove or slot) which, in effect, form the brake drum and with which the braking elements make frictional engagement when they are drawn down into the groove or slot of the sheave whenever the cable is actuated to effect such engagement.

Still further objects include the provision of a brake system in which the effective braking action may be equalized as between the wheels at opposite sides of the vehicle, in which after the initial actuation of the brake by an operator the braking elements may become self-energizing and automatically effect increasingly greater braking friction until the operator releases the brake, in which the brake shoe or brake blocks are formed in a novel shape and applied to and carried by the cable or other flexible carrier in a unique manner, in which means for the effective and positive release of the brake and protection against impaired operation by dirt and debris are readily and inexpensively included, and in which control of the application and release of the brake is always and instantly available as well as under the control of the vehicle driver regardless of the operability and condition of the regular or standard brakes and braking system of the vehicle.

Other objects as well as the advantages and uses of the invention will become apparent from the following description and claims and from the exemplification of the invention shown in the accompanying drawings, in which:

FIG. 1 is a top plan view of the rear part of the chassis of a truck tractor having dual wheels at each end of the driving axle with a presently preferred form of the brake mechanism of the invention applied thereto;

FIG. 2 is a view in side elevation of the truck tractor chassis shown in FIG. 1;

FIG. 2a is a sectional view taken substantially along the line 2A—2A of FIG. 1 showing a portion of the conventional brake drum and brake shoes cooperable therewith;

FIGS. 3 and 3a are sectional views taken substantially along the section line 3—3 of FIG. 1, on a scale larger than that of FIG. 2 and looking in the direction shown by the arrows, the view of FIG. 3 showing the brake as it appears when applied, the view of FIG. 3a showing the brake in inoperative or released condition;

FIG. 4 is a view, partly in section, of the brake operating mechanism support and the brake operating and equalizing cable, the view being taken along section line 4—4 of FIG. 2, looking in the direction shown by the arrows;

FIGS. 5, 6 and 7 are sectional views of fragments of the brake mechanism on an enlarged scale but taken respectively along section lines 5—5, 6—6 and 7—7 of FIG. 3, FIG. 5 showing the sheave-type brake drum with an end brake shoe element in section mounted on the carrying and tensioning cable and groove cleaning means embedded in the shoe element, FIG. 6 similarly showing another shoe element and a means by which a shoe element positioning, backing and retraction-spring plate may be connected with the cable, and FIG. 7 showing another shoe element;

FIG. 8 is a view in side elevation on a much enlarged scale, showing a number of the brake elements on the carrying and tensioning cable;

FIG. 9 is a view in section of one of the brake releasing or retracting spring mechanisms, the view being taken along line 9—9 in FIG. 3a, looking as indicated by the arrows; and FIG. 10 is a diagram of an electric circuit arrangement for operating electric motor means for tensioning and releasing or slacking the brake cable thereby to apply or release the brakes, the motors being of a reversible type.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring now to the drawings, FIG. 1 illustrates in plan the rear portion of a conventional truck chassis comprising side frame members 10, 11, cross member 12, drive shaft 13, differential case 14 and axle housing 15. Each side frame member 10, 11 carries the conventional spring mounting plates 16, 17 to which the usual leaf springs 18 are connected in a conventional manner. A conventional brake drum 51 and cooperating brake shoes 52 are provided at each end of the axle 15' for use as a service brake in the ordinary manner and as shown in FIG. 2a. The axle housing 15 is supported on the leaf springs 18, also in a conventional manner and the enclosed axle 15' carries, at either end, the usual dual wheels 19, 20 and 19' and 20'. Between the wheels of each pair of dual wheels there is fixed on the axle 15', by any suitable means such as by the wheel stud bolts and nuts generally designated 20', a sheave 21 (FIG. 3) of which the peripheral groove 22 (FIGS. 5–7) is formed with outwardly diverging walls 23, 24 so that the groove 22 is of truncated V-form. The sheave 21, which serves as a brake drum, is of course formed of suitably strong, tough and abrasion-resistant material. Each side member 10, 11 carries a fixture 25, 25', which fixtures support a transverse member 26 preferably in the form of a hollow member of rectangular section. In either end of the hollow member 26 there is provided an antifriction member which, in the illustrated embodiment, takes the form of a roller 27 mounted on a bolt 27' such that the axis of rotation of the roller lies approximately in the plane of the adjacent sheave 21 and is tilted slightly upwardly to the rear.

There is a bracket 28 secured adjacent to each end of member 26. Each bracket 28 supports a reversible electric motor 29 which, through conventional gearing (not shown) within a fixed housing 30, rotates sleeve 30' which is rotatably mounted in housing 30 and has an internal thread (not shown) engaged with the external thread of a shaft member 31. Shaft member 31 moves longitudinally of and in and out of sleeve 30' and may be secured, if necessary, against rotation by any suitable means such as an internal spline or splines cooperative with a complementary groove or spline carried internally of the housing 30 and secured against relative rotation. A motor mechanism suitable for effecting the linear movements of the cable is that sold under the name of Linear Actuator, Model No. 423W3 manufactured by Lear, Incorporated, Grand Rapids, Mich. Other devices including mechanisms operated by hydraulic or mechanical power may be employed as will be understood. At its outer or rearward end the shaft 31 is securely connected, as indicated at 32, to one end of a strong, flexible cable 33. In order that the cable tensioning and releasing mechanism together with the cable and brake shoes, as a unit, may be swung out of the way of the inner wheel to permit removal of the tire thereon each motor 29 and its associated parts 30 and 30' may be mounted on its bracket 28 by a universal joint as indicated at 28'.

The cable 33 extends around the sheave 21 on one side of the vehicle, through an aperture 26' in the lower side of the transverse member 26, over the roller 27, along the length of the transverse member 26, over a similar roller 27 on the opposite side of the vehicle and thence through another aperture in transverse member 26 downwardly and around the sheave 21 on the opposite side of the vehicle where its end is secured to another shaft member 31 after the manner described above, which in turn engages drive mechanism similar to that also described above. It will be appreciated that if the motor circuits (see FIG. 10) are so arranged, actuation of the motors 29 may cause them to act together to draw the shaft members 31 into the sleeves 30' thereby to foreshorten the effective length of the cable 33 thereby to draw its loops downward into the grooves of the sheaves. Opposite actuation of the motors will reverse this action thereby tending to increase the effective length of the cable or to loosen it to permit its outward movement from the sheave grooves.

Each loop 33' of the cable 33 carries a plurality of brake shoes or blocks 34 threaded thereon, the blocks 34 being provided with suitable apertures 35 to accommodate the cable. The brake shoes or blocks 34 constitute friction elements for effecting the braking action and may be molded, cast, cut or otherwise shaped into the general form of truncated pyramids so that their transversely facing surfaces are adapted, when the cable 33 is tightened, firmly and frictionally to engage the inner surfaces of the diverging side walls 23 and 24 of the corresponding sheave. The adjacent faces of the blocks 34 are likewise tapered so as to lie in planes generally radial to the axis of rotation of the axle 15' but, preferably, are relieved (see FIG. 8) over their interfaces so that when they are drawn down into the groove of the sheave these adjacent faces will approach one another over their entire surface areas for mutual support. The blocks 34 are preferably formed of any of the many well-known brake shoe or brake lining materials which are highly resistant to deterioration from heat and friction yet have a high coefficient of friction and which will have suitable strength, toughness, and abrasion-resistant qualities. Preferably, the shoes or blocks will be molded into their final shape but their composition and method of formation do not, per se, form part of the present invention. An end block 36 of each group may be provided with embedded filaments or bristles 37 of metal, "Nylon" or other material for engagement in the groove 22 of the respective sheaves so that the braking mechanism of the present invention is, in effect, self-cleaning.

Each group of blocks 34 is provided with a resilient backing member 38, which may be of spring steel, for example, seen in section in FIG. 5, each backing member 38 being preferably provided with in-turned flanges 39, 40 at its respective ends for retaining the group of blocks 34 in place. The entire unit consisting of the backing member 38 and blocks 34 is retained in the desired location on the cable 33 by means of clamping devices 41.

As mentioned above, rotation of either or both motors 29 in a given direction will tighten the cable 33 so as to cause a braking action at each end of the axle 15', while rotation of either or both of the motors in an opposite sense will cause the cable to loosen. However, since the aforesaid braking action, once initiated, tends to be self-energizing, i.e., self-tightening by reason of the friction of the rotating sheave upon the flexibly assembled blocks 34, it is desirable to provide resilient means for enlarging the circumference of the respective cable loops 33' upon relaxation of the cable 33 by the aforesaid action of the motors 29. This means may consist solely in the permanent set and resiliency of the backing member 38, but it is preferred to provide a more positive means for accomplishing the stated purpose. To this end, each backing member 38 carries at approximately the rearmost point of its outer surface, a small bracket 42 which is apertured to receive a hook 43 fastened at one end of a tension spring device 44, a suitable form of which is illustrated in greater detail in FIG. 9. The other end of the spring device 44 is secured to a hook 45 carried at the adjacent extremity of an angle bracket 46, the other extremity of which is secured in any suitable manner to the axle housing 15. Thus, when the tension on the cable 33 is relieved by rotation of the motors 29 in the direction to produce that result, the respective backing members 38 are drawn rearwardly by the respective springs 44. Each backing member 38 is connected with the corresponding cable loop 33' at a plurality of points, by means of clips 47 (FIG. 6), each of which may lie between adjacent blocks 34 or, if desired, they may be embedded in selected blocks. Each clip 47 is generally triangular in profile, the rounded apex 48 engaging the cable 33 interiorly of the loop 33', the respective ends 49, 49' of the clip 47 overlying the outer surface of the backing member 38. Expansion of the latter to a larger diameter due to its own resilience and to the rearward pull of the spring 44, thus causes expansion of the corresponding cable loop 33' and the partial withdrawal of the brake blocks 34 from the groove 22 of the sheave 21. This action is illustrated in FIGS. 3 and 3a, FIG. 3 showing the blocks 34 in braking engagement with the sheave, while FIG. 3a illustrates the disengaged position of the braking mechanism.

Actuation of the motors 29 is, of course, under control of the vehicle operator through means of a switch preferably located on the vehicle dashboard, the circuit being diagrammatically illustrated in FIG. 10. Each motor 29 is grounded to the frame of the vehicle as is also the battery 50. The motors 29 being reversible, the double-throw, double-pole switch 51 is adapted to energize both motors for operation in one direction through conductors 52, 53 or in the other direction through conductors 54, 55. In operation of the device, the operator will actuate the switch so as to cause tightening of the cable 33 until the desired braking effect is achieved, and when it is desired to release the brakes he will actuate the switch in a direction to lengthen the cable 33 until the brakes are released to the desired extent. In both operations the braking effect will be automatically equalized by reason of the fact that both cable loops 33' are formed at the respective ends of a single cable 33. The motor operating switch may be of any usual type commonly available upon the market so long as it serves the functions required. However, it may be desirable to employ a switch of the type in which the contacts will remain in circuit closed or open position as chosen by the operator although a type which automatically returns to neutral or circuit "open" position when released by the operator or other type may be employed.

Obviously, actuation of a single motor is sufficient to operate the device, the provision of two motors serving as a useful safety factor.

I claim:

1. A braking device for a vehicle having a frame, an axle carried by the frame and a wheel at each of opposite ends of the axle, in combination, a sheave secured relative to and concentric with a wheel for rotation therewith, a flexible cable extending about said sheave over a substantial arc not less than 180° of the sheave circumference and movable substantially in the mean plane of the sheave toward and from the bottom of the sheave groove, a plurality of friction elements carried solely by said cable within the limits of said arc and movable by the cable into and out of frictional engagement with the opposite walls defining the groove of the sheave, and means for moving the cable to draw the friction elements into and from frictional engagement with said opposite walls.

2. The braking device of claim 1 in which the means for moving the cable includes manually controllable means effective to draw the friction elements against the sheave groove walls and spring means tending to withdraw the friction elements away from said walls.

3. The braking device of claim 1 wherein each friction element is apertured for passage of the cable therethrough and is formed at its lateral sides to conform substantially to the respectively adjacent wall surfaces of the sheave groove.

4. The braking device of claim 3 in which the adjacent faces of adjacent friction elements extend substantially radially of the sheave whereby to approach parallelism as the elements are moved inward of the sheave groove.

5. The combination of claim 1, said means for moving the cable comprising a reversible electric motor operatively associated with one end of said cable for increasing and decreasing the effective length of the cable and means for selectively energizing said motor for actuation in either sense.

6. The combination of claim 2 in which there is a backing member abutting the radially exterior ends of the said friction elements and means for securing said backing member to the cable, and in which the said spring means is secured to the backing member and to a fixed part of the vehicle.

7. The combination of claim 6 in which the means for securing the backing member to the cable comprises links disposed at intervals along the arc of the cable about said sheave and releasably connecting the cable and backing member.

8. The combination of claim 1, each of said friction elements having substantially the form of a truncated pyramid with a cable receiving aperture extending between one pair of oppositely disposed tapering faces.

9. A braking system of a vehicle having a frame, an axle carried by the frame and a wheel at each of opposite ends of the axle, in combination, a sheave secured relative to each of said wheels for rotation therewith, a flexible cable extending about each of said sheaves over a substantial arc not less than 180° of each sheave circumference and movable substantially in the mean plane of each said sheave toward and from the bottom of the groove of each said sheave, relatively fixed anti-friction means secured to the frame, said cable passing about one of said sheaves, about said anti-friction means and then about the other of said sheaves, a plurality of friction elements carried by said cable for corresponding frictional engagement with each of said sheaves and movable into and out of frictional engagement with the walls defining the sheave grooves, the opposite ends of said cable being anchored to said frame, and means for tensioning said cable by changing the position of an anchor thereof whereby said cable is moved to effect frictional engagement of the friction elements with the opposite walls forming the groove of each said sheave.

10. A braking system according to claim 9 wherein the said means for moving the cable comprises a reversible motor to tension and slacken either end of the cable by changing the effective length of the cable.

11. The combination of claim 1, wherein said vehicle comprises a pair of dual wheels at each end of said axle, said sheave being secured to said axle between the wheels of one of said pairs.

12. A braking system according to claim 9, wherein said vehicle comprises a pair of dual wheels at each end of said axle, each said sheave being secured to said axle between the wheels of one of said pairs.

13. The braking device of claim 1 wherein the vehicle is also provided with conventional brake means at opposite ends of the axle whereby the braking device is capable of use as an auxiliary brake in the event of failure of the conventional brake means.

References Cited

UNITED STATES PATENTS

| | | |
|---|---|---|
| 514,655 | 2/1894 | Kerwin. |
| 1,123,786 | 1/1915 | Norris. |
| 1,565,240 | 12/1925 | Anderson _____ 188—259 |
| 2,272,003 | 2/1942 | Holland _____ 188—259 X |
| 2,734,590 | 2/1956 | Hays. |
| 2,773,568 | 12/1956 | Ragland _____ 188—259 X |
| 3,313,379 | 4/1967 | Dence. |

DUANE A. REGER, Primary Examiner

U.S. Cl. X.R.

188—162, 259